United States Patent
Kobayashi et al.

(10) Patent No.: US 9,873,806 B2
(45) Date of Patent: *Jan. 23, 2018

(54) INK COMPOSITION FOR AQUEOUS INK BALL POINT PEN

(71) Applicant: MITSUBISHI PENCIL COMPANY, LIMITED, Shinagawa-ku (JP)

(72) Inventors: Yusuke Kobayashi, Yokohama (JP); Noriko Sakane, Yokohama (JP); Tomoyuki Akaki, Yokohama (JP)

(73) Assignee: MITSUBISHI PENCIL COMPANY, LIMITED, Tokyo (JP)

( * ) Notice: Subject to any disclaimer, the term of this patent is extended or adjusted under 35 U.S.C. 154(b) by 600 days.

This patent is subject to a terminal disclaimer.

(21) Appl. No.: 14/495,471

(22) Filed: Sep. 24, 2014

(65) Prior Publication Data

US 2015/0093176 A1 Apr. 2, 2015

(30) Foreign Application Priority Data

Sep. 30, 2013 (JP) ................................. 2013-203135

(51) Int. Cl.
- C09D 11/18 (2006.01)
- C09D 129/04 (2006.01)
- C08K 3/38 (2006.01)
- B43K 7/01 (2006.01)

(52) U.S. Cl.
CPC .............. C09D 11/18 (2013.01); B43K 7/01 (2013.01); C09D 129/04 (2013.01); C08K 2003/387 (2013.01)

(58) Field of Classification Search
CPC ........ C09D 11/18; C09D 129/04; C08K 3/38; C08K 2003/387; B43K 7/01
USPC ................................. 106/31.13, 31.27, 31.6
See application file for complete search history.

(56) References Cited

U.S. PATENT DOCUMENTS

| | | | |
|---|---|---|---|
| 4,545,818 A | 10/1985 | Inoue et al. | |
| 5,466,283 A | 11/1995 | Kondo et al. | |
| 5,785,746 A * | 7/1998 | Kito | C09D 11/18 106/31.58 |
| 6,485,609 B1 * | 11/2002 | Boylan | B41M 5/5254 162/135 |
| 6,924,011 B2 * | 8/2005 | Van Aert | B41M 5/5254 428/32.32 |
| 8,220,911 B2 * | 7/2012 | Nakano | C09D 11/328 106/31.13 |
| 9,416,286 B2 * | 8/2016 | Takeuchi | B43K 7/00 |
| 2003/0113514 A1 * | 6/2003 | Saito | C09D 129/04 428/195.1 |
| 2005/0120914 A1 * | 6/2005 | Momose | C09D 11/18 106/31.65 |
| 2008/0165237 A1 * | 7/2008 | Yamauchi | C09D 11/40 347/102 |
| 2009/0311448 A1 * | 12/2009 | Takahashi | C09D 129/04 428/32.28 |
| 2015/0197658 A1 * | 7/2015 | Oguri | C09D 129/04 524/265 |
| 2015/0301247 A1 * | 10/2015 | Taima | C09D 129/04 359/359 |
| 2015/0352877 A1 * | 12/2015 | Niu | C09D 129/04 428/32.34 |
| 2016/0251466 A1 * | 9/2016 | Kato | B65D 65/42 |

FOREIGN PATENT DOCUMENTS

| | | | |
|---|---|---|---|
| JP | 59-74175 A | | 4/1984 |
| JP | 5-271597 A | | 10/1993 |
| JP | 6-88050 A | | 3/1994 |
| JP | 2000-345090 A | | 12/2000 |
| JP | 2002-338869 A | | 11/2002 |
| JP | 2012/097187 | * | 5/2012 |
| WO | WO 2014/058024 A1 | * | 4/2014 |
| WO | WO 2014/069507 A1 | * | 5/2014 |

OTHER PUBLICATIONS

English translation of JP 2012/097187, May 2012; 9 pages.*
English translation of JP 05/271597, Oct. 1993; 7 pages.*
English translation of JP 2002/338869, Nov. 2002; 6 pages.*
English translation of JP 2000/345090, Dec. 2000; 20 pages.*

* cited by examiner

*Primary Examiner* — Helene Klemanski
(74) *Attorney, Agent, or Firm* — Buchanan, Ingersoll & Rooney PC

(57) ABSTRACT

Provided are an ink composition for an aqueous ink ball point pen, which contains modified polyvinyl alcohol and at least one selected from boric acid and salts thereof, and an aqueous ink ball point pen charged with the ink composition, wherein the boric acid and the salts thereof are preferably at least one selected from boric acid, alkali metal salts of boric acid and ammonium salts of boric acid.

16 Claims, No Drawings

INK COMPOSITION FOR AQUEOUS INK BALL POINT PEN

This Nonprovisional application claims priority under 35 U.S.C. §119(a) on Patent Application No. 2013-203135 filed in Japan on 30 Sep. 2013, the entire contents of which are hereby incorporated by reference.

BACKGROUND OF THE INVENTION (1) Field of the Invention

The present invention relates to an ink composition for an aqueous ink ball point pen which does not cause feathering on written lines and does not allow an ink to strike through into a back side of paper and which does not bring about starving, blobbing and splitting and makes it possible to write fine letters.

(2) Related Art

Low viscosity aqueous ink ball point pens have so far made a smooth feeling in writing and enabled to write with a low pen pressure but caused feathering on written lines.

Then, for the purpose of solving the feathering problem, a viscosity controlling agent (gelling agent) for providing an ink with a shear thinning property (non-Newtonian property) is added to an ink composition for an aqueous ink ball point pen.

Known as the above ink composition for an aqueous ink ball point pen are, for example, 1) an ink composition for an aqueous ink ball point pen characterized by containing 0.20 to 0.45% by weight of xanthan gum (Japanese Patent Application Laid-open Sho 59 No. 74175) and 2) an aqueous ink composition for a writing instrument suitable for a ball point pen, comprising as essential components, a) a colorant, b) an organic acid-modified heteropolysaccharide which comprises a fundamental unit constituted by glucose/galactose/pyruvic acid or a salt thereof/succinic acid or a salt thereof/acetic acid of 5 to 8/1 to 2/0.5 to 2/0.5 to 2/0.5 to 1 in terms of a molar ratio and which has an average molecular weight of about 1,000,000 to about 8,000,000 and c) an aqueous medium comprising water and a water-soluble organic medium, wherein water accounts for 50 or more % by weight (Japanese Patent Application Laid-open Hei 6 No. 88050).

The ink compositions for an aqueous ink ball point pen described in Japanese Patent Application Laid-open Sho 59 No. 74175 and Japanese Patent Application Laid-open Hei 6 No. 88050 described above can be improved in feathering on written lines, but involved therein are problems that they bring about splitting and blobbing and that they are short of an ink followability and do not make a smooth feeling in writing.

On the one hand, for example, an aqueous pigment ink comprising at least titanium oxide, an extender pigment, a dispersant, an emulsion of polyvinyl alcohol having a polymerization degree of 200 to 1000 and/or a styrene•acryl base copolymer and water (Japanese Patent Application Laid-open No. 2000-345090) is known as an ink for a writing instrument such as a marking pen and a ball point pen, in which polyvinyl alcohol is used. Also, for example, an aqueous pigment ink comprising at least a pigment, anionic group-modified polyvinyl alcohol and water (Japanese Patent Application Laid-open Hei 5 No. 271597) is known as an aqueous pigment ink, in which modified polyvinyl alcohol is used.

On the other hand, as an aqueous ink composition in which an alkali metal borate and the like are used, known are an aqueous ink composition comprising an alkali metal silicate and/or an alkali metal borate for improving corrosion resistance of a cemented carbide-made ball at a tip part of the pen, and an aqueous ink ball point pen charged with the same (Japanese Patent Application Laid-open No. 2002-338869).

However, the polyvinyl alcohol in the ink for a writing instrument described in foregoing Japanese Patent Application Laid-open No. 2000-345090 is used in order to improve dispersion stability of the pigment in freezing and thawing, and the objects and the problems are different from those in the present invention. In addition thereto, it is neither described nor perceived at all to use it in combination with borate.

Also, the anionic group-modified polyvinyl alcohol in the aqueous pigment ink described in foregoing Japanese Patent Application Laid-open Hei 5 No. 271597 is used for an aqueous pigment ink which is less liable to bring about the problem of wrinkles and warps on paper (Japanese writing paper) after drying handwritings and which is suitable particularly for Indian ink, and the objects and the problems are different from those in the present invention. In addition thereto, it is neither described nor perceived at all to use it in combination with borate.

Further, the alkali metal borate in the aqueous ink composition described in foregoing Japanese Patent Application Laid-open No. 2002-338869 is used in order to form a thin film of the alkali metal borate on the ball to prevent the ball and the tip holder from being corroded, and the objects and the problems are different from those in the present invention. In addition thereto, it is neither described nor perceived at all to use the alkali metal borate in combination with polyvinyl alcohol.

SUMMARY OF THE INVENTION

In light of the problems on the conventional art described above, the present invention intends to solve them, and an object thereof is to provide an ink composition for an aqueous ink ball point pen which does not cause feathering on written lines and does not allow an ink to strike through into a back side of paper and which does not bring about starving, blobbing and splitting and makes it possible to write fine letters.

In light of the conventional problems described above and the like, intense researches repeated by the present inventors have resulted in finding that an ink composition for an aqueous ink ball point pen which meets the object described above is obtained by adding two kinds of specific compounds as a viscosity controlling agent to an ink composition for an aqueous ink ball point pen. Thus, the present invention has come to be completed.

That is, the present invention comprises the following items (1) to (5).

(1) An ink composition for an aqueous ink ball point pen, wherein the ink composition comprises modified polyvinyl alcohol and at least one selected from boric acid and salts thereof.

(2) The ink composition for an aqueous ink ball point pen as described in the above item (1), wherein a content of the modified polyvinyl alcohol is 0.1 to 8% by mass based on the total amount of the ink composition for an aqueous ink ball point pen.

(3) The ink composition for an aqueous ink ball point pen as described in the above item (1) or (2), wherein a content of at least one selected from the boric acid and the salts thereof is 0.01 to 3% by mass based on the total amount of the ink composition for an aqueous ink ball point pen.

(4) The ink composition for an aqueous ink ball point pen as described in any one of the above items (1) to (3), wherein the boric acid and the salts thereof are at least one selected from boric acid, alkali metal salts of boric acid and ammonium salts of boric acid.

(5) An aqueous ink ball point pen charged with the ink composition for an aqueous ink ball point pen as described in any one of the above items (1) to (4).

According to the present invention, provided are an ink composition for an aqueous ink ball point pen which does not cause feathering on written lines and does not allow an ink to strike through into a back side of paper and which does not bring about starving, blobbing and splitting and makes it possible to write fine letters, and an aqueous ink ball point pen.

DETAILED DESCRIPTION OF THE INVENTION

The embodiments of the present invention shall be explained below in detail.

The ink composition for an aqueous ink ball point pen of the present invention is characterized by comprising modified polyvinyl alcohol and at least one selected from boric acid and salts thereof.

Modified polyvinyl alcohol, and boric acid and a salt thereof which are used in the present invention are used as a viscosity controlling agent, and it is only when two kinds of the viscosity controlling agents are added to an ink composition for an aqueous ink ball point pen that the effects of the present invention are exerted.

The modified polyvinyl alcohol used in the present invention includes various modified PVA obtained by modifying at least a part of a hydroxyl group, an acetal group and an end group of polyvinyl alcohol (hereinafter abbreviated as PVA), "formula: $—[CH_2—CH(OH)]_m—[CH_2—CH(OCOCH_3)]_n—$" with a hydrogen atom, various anions such as carboxylic acids and acrylic acid, ammonium, various cations, hydrophobic groups such as alkyl groups, and carbonyl groups and the like. It includes, for example, carboxyl group-modified PVA, sulfonic acid group-modified PVA, ethylene oxide group-modified PVA, and modified PVA having the modifying groups described above on side chains of PVA. Further, PVA-acrylic acid-methacrylic acid copolymers prepared by copolymerizing partially saponified PVA with acrylic acid and methyl methacrylate can also be used as the modified PVA of the present invention.

The modified PVA used in the present invention has a saponification degree [$(m/(m+n))×100$] of preferably 50 mol % or more, more preferably 75 mol % or more from the viewpoints of an aging stability and a thickening property of the ink.

The modified PVA having the saponification degree described above has a polymerization degree (m+n) of preferably 300 or more, more preferably 300 to 3000 and particularly preferably 300 to 2000 from the viewpoints of further exerting the effects of the present invention to enhance beauty of letters without damaging writing feeling and a coloring property.

The modified PVA which can specifically be used includes Gohsenx L series and Gohsenx WO series (trade names of Nippon Synthetic Chemical Industry Co., Ltd.) manufactured by Nippon Synthetic Chemical Industry Co., Ltd., anionically modified PVA-A series (trade names of Japan Vam & Poval Co., Ltd.) manufactured by Japan Vam & Poval Co., Ltd., anionically modified PVA-K polymer series (trade names of Kuraray Co., Ltd.) manufactured by Kuraray Co., Ltd., and the like. Also, the PVA-acrylic acid-methacrylic acid copolymer includes POVACOAT (trade names of Daido Chemical Corporation) manufactured by Daido Chemical Corporation, and the like.

The modified PVA may be used alone or in combination of two or more kinds thereof.

A content of the modified PVA is preferably 0.1 to 8% by mass, more preferably 0.4 to 5% by mass and particularly preferably 1 to 4% by mass based on the total amount of the ink composition for an aqueous ink ball point pen.

If the content is less than 0.1% by mass, the thickening performance is not satisfactory, and a feathering resistance of the drawn lines is reduced. On the other hand, if it exceeds 8% by mass, a viscosity of the ink composition is too high, and a following performance thereof is lowered. Accordingly, both are not preferred.

The boric acid and the salts thereof used in the present invention include boric acid, alkali metal salts (lithium, sodium, potassium and rubidium) of boric acid, an ammonium salt of boric acid, and the like. They include, for example, boric acid ($H_3BO_3$), diboron trioxide ($B_2O_3$), sodium metaborate ($NaBO_2$), sodium diborate ($Na_4B_2O_5$), sodium tetraborate ($Na_2B_4O_7$), sodium pentaborate ($NaB_5O_8$), sodium hexaborate ($Na_2B_6O_{10}$), sodium octaborate ($NaB_8O_{13}$), ammonium pentaborate [$(NH_4)_2O•5B_2O_3$], and hydrates thereof, and the like. They may be used alone or may be used in combination of two or more kinds thereof.

Sodium tetraborate, ammonium pentaborate and diboron trioxide are preferably used from the viewpoints of solubility in ink components and versatility.

A total content of the boric acid and salts thereof is preferably 0.01 to 3% by mass, more preferably 0.1 to 1% by mass based on the total amount of the ink composition for an aqueous ink ball point pen.

If the content of the boric acid and salts thereof is less than 0.01% by mass, the thickening performance is not satisfactory. On the other hand, if it exceeds 3% by mass, defects such as reduction in an aging stability of the ink viscosity are brought about in a certain case.

The ink composition for an aqueous ink ball point pen of the present invention can suitably contain, in addition to the respective components described above, coloring materials and, as a balance, water (tap water, refined water, distilled water, ion-exchanged water, purified water, and the like) which is a solvent, and various components which are used usually for aqueous ink ball point pens, such as water-soluble organic solvents, viscosity controlling agents other than modified PVA and boric acid salts which are the viscosity controlling agents described above, dispersants, lubricants, rust preventives, antiseptic agents or fungicides and pH controlling agents as long as the effects of the present invention are not damaged.

Dyes which are dissolved or dispersed in water, conventionally known inorganic or organic pigments such as titanium oxide, resin particle pigments containing pigments, pseudo pigments obtained by coloring resin emulsions with dyes, white plastic pigments, pigments obtained by coating iron oxide and titanium oxide in multilayers on a surface of silica and mica as a base material, and the like can be used as the coloring material used in the present invention as long as the effects of the present invention are not damaged.

The dye includes, for example, acid dyes such as Eosin, Phloxine, Water Yellow #6-C, Acid Red, Water Blue #105, Brilliant Blue FCF and Nigrosine NB; direct dyes such as Direct Black 154, Direct Sky Blue 5B and Violet BOOB; and basic dyes such as Rhodamine and methyl violet; and the like.

The inorganic pigment includes, for example, azo lakes, insoluble azo pigments, chelate azo pigments, phthalocyanine pigments, perylene and perinone pigments, nitroso pigments, and the like. To be more specific, it includes inorganic pigments such as carbon black, titan black, zinc oxide, red iron oxide, aluminum, chromium oxide, black iron oxide, cobalt blue, yellow iron oxide, viridian, zinc sulfide, lithopone, cadmium yellow, vermilion, cadmium red, chrome yellow, molybdate orange, zinc chromate, strontium chromate, white carbon, clay, talc, ultramarine, precipitated barium sulfate, baryte powders, calcium carbonate, white lead, Prussian blue, manganese violet, aluminum powders, brass powders, C.I. Pigment Blue 15, C.I. Pigment Blue 17, C.I. Pigment Blue 27, C.I. Pigment Red 5, C.I. Pigment Red 22, C.I. Pigment Red 38, C.I. Pigment Red 48, C.I. Pigment Red 49, C.I. Pigment Red 53, C.I. Pigment Red 57, C.I. Pigment Red 81, C.I. Pigment Red 104, C.I. Pigment Red 146, C.I. Pigment Red 245, C.I. Pigment Yellow 1, C.I. Pigment Yellow 3, C.I. Pigment Yellow 12, C.I. Pigment Yellow 13, C.I. Pigment Yellow 14, C.I. Pigment Yellow 17, C.I. Pigment Yellow 34, C.I. Pigment Yellow 55, C.I. Pigment Yellow 74, C.I. Pigment Yellow 95, C.I. Pigment Yellow 166, C.I. Pigment Yellow 167, C.I. Pigment Orange 5, C.I. Pigment Orange 13, C.I. Pigment Orange 16, C.I. Pigment Violet 1, C.I. Pigment Violet 3, C.I. Pigment Violet 19, C.I. Pigment Violet 23, C.I. Pigment Violet 50, C.I. Pigment Green 7, and the like.

The above coloring materials can be used alone or in a mixture of two or more kinds thereof.

A content of the coloring materials can suitably be controlled in a range of 0.1 to 40% by mass based on the total amount of the ink composition for an aqueous ink ball point pen.

The water-soluble organic solvent which can be used includes, for example, glycols such as ethylene glycol, diethylene glycol, triethylene glycol, propylene glycol, polyethylene glycol, 3-butylene glycol, thiodiethylene glycol, glycerin; ethylene glycol monomethyl ether, diethylene glycol monomethyl ether, and the like, and they can be used alone or in a mixture.

A content of the above water-soluble organic solvents is preferably 3 to 30% by mass based on the total amount of the ink composition for an aqueous ink ball point pen.

The viscosity controlling agent which can be used is preferably, for example, at least one selected from the group consisting of synthetic polymers, cellulose and polysaccharides.

To be specific, it includes gum arabic, tragacanth gum, guar gum, locust bean gum, alginic acid, carrageenan, gelatin, xanthan gum, welan gum, succinoglycan, diutan gum, dextran, methyl cellulose, ethyl cellulose, hydroxyethyl cellulose, carboxymethyl cellulose, carboxymethyl starch and salts thereof, alginic acid propylene glycol ester, polyvinylpyrrolidone, polyvinyl methyl ether, polyacrylic acid and salts thereof, carboxyvinyl polymers, polyethylene oxide, copolymers of vinyl acetate and polyvinylpyrrolidone, cross-linking type acrylic acid polymers and salts thereof, non-cross-linking type acrylic acid polymers and salts thereof, styrene-acrylic acid copolymers and salts thereof, and the like.

The dispersant includes at least one of styrene-maleic acid copolymers and salts thereof, styrene-acrylic acid copolymers and salts thereof, α-methylstyrene-acrylic acid copolymers and salts thereof, polyacrylic acid-polymethacrylic acid copolymers, and the like.

The lubricant includes nonionic lubricants such as fatty acid esters of polyhydric alcohols which are also used as a surface treating agent for pigments, higher fatty acid esters of saccharides, polyoxyalkylene higher fatty acid esters, alkylphosphoric acid esters, anionic lubricants such as phosphoric acid esters, alkylsulfonic acid salts of higher fatty acid amides, alkylarylsulfonic acid salts, derivatives of polyalkylene glycols, fluorine base surfactants, polyether-modified silicones, and the like.

The rust preventive includes benzotriazole, tolyltriazole, dicyclohexylammonium nitrite, saponins, and the like. The antiseptic agent or the fungicide includes phenol, sodium omadine, sodium benzoate, benzimidazole base compounds, and the like.

The pH controlling agent includes hydroxides of alkali metals, such as sodium hydroxide, potassium hydroxide, lithium hydroxide, amine compounds such as triethanolamine, diethanolamine, monoethanolamine, dimethylethanolamine, morpholine, triethylamine, ammonia, and the like.

Methods which have so far been known can be employed in order to manufacture the ink composition for an aqueous ink ball point pen of the present invention, and it is obtained, for example, by blending modified polyvinyl alcohol, at least one of boric acid and salts thereof, and the coloring material each described above, and in addition thereto, the foregoing respective components for the aqueous ink composition described above in prescribed amounts, and stirring and mixing them by means of a stirrer such as a homo mixer and a disper. Further, coarse particles contained in the ink composition may be removed, if necessary, by filtration and centrifugal separation.

The ink composition for an aqueous ink ball point pen of the present invention can be used by charging into a ball point pen equipped with a pen tip part such as a metal tip and a resin tip.

The aqueous ink ball point pen which can be used is a ball point pen charged with the ink composition for an aqueous ink ball point pen having the formulation described above, and it is preferably a ball point pen having a constitution in which the ink composition having the characteristics described above is charged in an ink reservoir comprising a pipe or a pipe-shaped molded article equipped directly or via a relay member with a ball point pen tip rotatably holding a metal ball or the like and in which an ink follower is mounted on a rear surface of the above ink composition. The ink follower includes substances which are not compatible with the ink composition for an aqueous ink ball point pen charged in the ink reservoir and which have a small specific gravity as compared with that of the ink composition for an aqueous ink ball point pen, for example, polybutene, silicone oils, mineral oils and the like.

The structure of the ball point pen shall not specifically be restricted and may be, for example, a free ink type ball point pen having a collector structure (ink holding mechanism), wherein the ball point pen is equipped with a barrel as an ink reservoir and the ink composition for an aqueous ink ball point pen having the formulation described above is charged in the barrel.

It is not certain why the ink composition for an aqueous ink ball point pen of the present invention which is constituted in the manner described above exerts functions of causing no feathering on written lines, allowing no ink to strike through into a back side of paper, not bringing about starving, blobbing and splitting and making it possible to write fine letters. However, this is presumed to be attributable to that modified PVA as the viscosity controlling agent is used in combination with at least one of the boric acid and the salts thereof in the ink composition, whereby the suitable ink flowing characteristic is exerted in a range in which a writing speed and a writing pressure in writing lines and the like are varied.

It is not necessary to use in a large amount the modified PVA and at least one of the boric acid and the salts thereof each described above in order to obtain the effects of the present invention, and the exertion period and the duration of the effects are long. Further, the ink is excellent as well in aging stability since it is water-soluble.

EXAMPLES

Next, the present invention shall be explained in further details with reference to examples and comparative examples, but the present invention shall not be restricted to the examples shown below.

Examples 1 to 5 and Comparative Examples 1 to 5

The respective ink compositions for an aqueous ink ball point pen were prepared by an ordinary method according to recipes shown in the following Table 1. The respective ink compositions (total amount: 100% by mass) for an aqueous ink ball point pen thus obtained were used to prepare aqueous ink ball point pens by the following method, and feathering•blobbing, starving, splitting resistance and strike-through of the ink compositions were evaluated by the following evaluating methods.

The results thereof are shown in the following Table 1.

Preparation of Aqueous Ink Ball Point Pens:

A barrel of a ball point pen (trade name: Signo UM-100, (manufactured by Mitsubishi Pencil Co., Ltd.) was used to hold a refill comprising a propylene-made ink reservoir having an inner diameter of 3.8 mm and a length of 113 mm, a stainless steel-made tip (cemented carbide ball, ball diameter: 0.7 mm) and a joint connecting the reservoir with the tip, and the refill is charged with each of the inks described above, with an ink follower comprising polybutene loaded at a rear end of the ink, whereby an aqueous ink ball point pen was prepared.

Evaluating Method of Feathering•Blobbing:

The respective aqueous ink ball point pens prepared above were used to handwrite a Chinese character on paper for a writing test, and the state of feathering and blobbing in the first stroke of the character was visually observed to evaluate it according to the following criteria.

○: feathering and blobbing were scarcely observed.

Δ: feathering or blobbing was slightly observed.

×: feathering and blobbing were severely observed, and the drawn lines were dirty.

Evaluating Method of Starving:

The respective aqueous ink ball point pens prepared above were used to handwrite a Chinese character on paper for a writing test, and the state of starving at an end part of the second stroke of the character was visually observed to evaluate it according to the following criteria.

○: the line at an end part of the written line was very narrow and free of starving, and the fine lines could be written.

Δ: the written line was starved a little, and intensity of the written line was pale.

×: the written line was starved very much, and the drawn line was dirty.

Evaluating Method of Splitting Resistance:

The respective aqueous ink ball point pens prepared above were used to handwrite a Chinese character on paper for a writing test, and the quality of the fifth stroke of the character was visually observed to evaluate it according to the following criteria.

○: splitting was not observed at all, and the fine line could be written.

Δ: splitting was slightly observed, and intensity of the written line was pale.

×: splitting was observed, and the drawn line was dirty.

Evaluating Method of Strike-Through:

The respective aqueous ink ball point pens prepared above were used to handwrite a Chinese character on rough paper, and a back surface of the paper on which lines were drawn was visually observed to evaluate it according to the following criteria.

○: strike-through was scarcely observed.

Δ: strike-through was slightly observed.

×: strike-through was apparently observed.

TABLE 1

| | | Example | | | | | Comparative Example | | | | |
|---|---|---|---|---|---|---|---|---|---|---|---|
| | | 1 | 2 | 3 | 4 | 5 | 1 | 2 | 3 | 4 | 5 |
| Recipe | Viscosity controlling agent A: modified polyvinyl alcohol A *1 | 4.0 | 8.0 | | | | | | | 8.0 | |
| | Viscosity controlling agent A: modified polyvinyl alcohol B *2 | | | 1.5 | | | | | | | |
| | Viscosity controlling agent A: modified polyvinyl alcohol C *3 | | | | 2.0 | | | | | | |
| | Viscosity controlling agent A: modified polyvinyl alcohol D *4 | | | | | 5.0 | | | | | |
| | Viscosity controlling agent B: sodium tetraborate | | | 0.3 | | 0.1 | | | | | |
| | Viscosity controlling agent B: ammonium borate | 3.0 | 0.1 | | 0.1 | | | | | | 3.0 |
| | Viscosity controlling agent C: cross-linking type acrylic acid copolymer *5 | | | | | | | 0.6 | | | |
| | Viscosity controlling agent D: polyvinylpyrrolidone *6 | | | | | | | | 7.0 | | |
| | Coloring material: carbon black *7 | | | 7.0 | 7.0 | | 7.0 | 7.0 | 7.0 | 7.0 | 7.0 |
| | Coloring material: black dye *8 | | 30.0 | | | | | | | | |
| | Coloring material: self-dispersion pigment toner *9 | 30.0 | | | | 30.0 | | | | | |
| | Dispersant: *10 | | | 5.5 | 5.5 | 2.0 | 5.5 | 5.5 | 5.5 | 5.5 | 5.5 |

TABLE 1-continued (Total amount 100 mass %)

|  |  | Example | | | | | Comparative Example | | | | |
|---|---|---|---|---|---|---|---|---|---|---|---|
|  |  | 1 | 2 | 3 | 4 | 5 | 1 | 2 | 3 | 4 | 5 |
|  | Lubricant: phosphoric acid ester *11 | 0.5 | 0.5 | 0.5 | 0.5 | 0.5 | 0.5 | 0.5 | 0.5 | 0.5 | 0.5 |
|  | Rust preventive: benzotriazole | 0.3 | 0.3 | 0.3 | 0.3 | 0.3 | 0.3 | 0.3 | 0.3 | 0.3 | 0.3 |
|  | Antiseptic agent: *12 | 0.3 | 0.3 | 0.3 | 0.3 | 0.3 | 0.3 | 0.3 | 0.3 | 0.3 | 0.3 |
|  | pH controlling agent: triethanolamine | 2.5 | 2.5 | 2.5 | 2.5 | 2.5 | 2.5 | 2.5 | 2.5 | 2.5 | 2.5 |
|  | Solvent: propylene glycol | 12.0 | 12.0 | 12.0 | 12.0 | 12.0 | 12.0 | 12.0 | 12.0 | 12.0 | 12.0 |
|  | Water: (ion-exchanged water) | Balance | Balance | Balance | Balance | Balance | Balance | Balance | Balance | Balance | Balance |
| Evaluation | Feathering · blobbing | ○ | ○ | ○ | ○ | ○ | Δ | x | ○ | Δ | x |
|  | Starving | ○ | ○ | ○ | ○ | ○ | Δ | ○ | Δ | x | ○ |
|  | Splitting resistance | ○ | Δ | ○ | ○ | Δ | x | ○ | x | Δ | ○ |
|  | Strike-through | ○ | ○ | ○ | ○ | ○ | ○ | x | ○ | Δ | x |

*1: Gohsenx L series L-3266 (manufactured by Nippon Synthetic Chemical Industry Co., Ltd.), saponification degree: 86.5 to 89, anionically modified (sulfonic acid group-modified) PVA
*2: AT-17 (manufactured by Japan Vam & Poval Co., Ltd.), saponification degree: 92 to 95, polymerization degree: 1700, anionically modified (carboxyl group-modified) PVA
*3: Gohsenx WO series WO-320N (manufactured by Nippon Synthetic Chemical Industry Co., Ltd.), saponification degree: 98.5 or more, ethylene oxide group-modified PVA
*4: POVACOAT ® type F (manufactured by Daido Chemical Corporation), polymerization degree: 450 to 550, PV•Aacrylic acid•methacrylic acid copolymer
*5: Primal TT-935 (manufactured by Rohm & Haas Japan Inc.)
*6: polyvinylpyrrolidone K-30 (manufactured by Nippon Shokubai Co., Ltd.)
*7: Carbon Black MA-100 (manufactured by Mitsubishi Chemical Corporation)
*8: Water Black 191L (manufactured by Orient Chemical Industries Co., Ltd.)
*9: CAB-O-JET ® 200 (manufactured by Cabot Corporation)
*10: JONCRYL 61J (manufactured by BASF Japan Ltd.)
*11: Phosphoric acid ester RS-610 (manufactured by Toho Chemical Industry Co., Ltd.)
*12: Bestcide 600 (manufactured by Nippon Soda Co., Ltd.)

As apparent from the results shown in Table 1 described above, it has been found that the ink compositions for an aqueous ink ball point pen which do not bring about feathering•blobbing, starving, splitting and strike-through and which make it possible to write fine letters as compared with the ink compositions prepared in Comparative Examples 1 to 5 falling outside the scope of the present invention are obtained in Examples 1 to 5 falling in the scope of the present invention and that the ink compositions which are suited to aqueous ink ball point pens are obtained in the present invention.

What is claimed is:

1. An ink composition for an aqueous ink ball point pen, wherein the ink composition comprises modified polyvinyl alcohol and at least one selected from boric acid and salts thereof.

2. The ink composition for an aqueous ink ball point pen as described in claim 1, wherein a content of the modified polyvinyl alcohol is 0.1 to 8% by mass based on the total amount of the ink composition for an aqueous ink ball point pen.

3. The ink composition for an aqueous ink ball point pen as described in claim 1, wherein a content of at least one selected from the boric acid and the salts thereof is 0.01 to 3% by mass based on the total amount of the ink composition for an aqueous ink ball point pen.

4. The ink composition for an aqueous ink ball point pen as described in claim 2, wherein a content of at least one selected from the boric acid and the salts thereof is 0.01 to 3% by mass based on the total amount of the ink composition for an aqueous ink ball point pen.

5. The ink composition for an aqueous ink ball point pen as described in claim 1, wherein the boric acid and the salts thereof are at least one selected from boric acid, alkali metal salts of boric acid and ammonium salts of boric acid.

6. The ink composition for an aqueous ink ball point pen as described in claim 2, wherein the boric acid and the salts thereof are at least one selected from boric acid, alkali metal salts of boric acid and ammonium salts of boric acid.

7. The ink composition for an aqueous ink ball point pen as described in claim 3, wherein the boric acid and the salts thereof are at least one selected from boric acid, alkali metal salts of boric acid and ammonium salts of boric acid.

8. The ink composition for an aqueous ink ball point pen as described in claim 4, wherein the boric acid and the salts thereof are at least one selected from boric acid, alkali metal salts of boric acid and ammonium salts of boric acid.

9. An aqueous ink ball point pen charged with the ink composition for an aqueous ink ball point pen as described in claim 1.

10. An aqueous ink ball point pen charged with the ink composition for an aqueous ink ball point pen as described in claim 2.

11. An aqueous ink ball point pen charged with the ink composition for an aqueous ink ball point pen as described in claim 3.

12. An aqueous ink ball point pen charged with the ink composition for an aqueous ink ball point pen as described in claim 4.

13. An aqueous ink ball point pen charged with the ink composition for an aqueous ink ball point pen as described in claim 5.

14. An aqueous ink ball point pen charged with the ink composition for an aqueous ink ball point pen as described in claim 6.

15. An aqueous ink ball point pen charged with the ink composition for an aqueous ink ball point pen as described in claim 7.

16. An aqueous ink ball point pen charged with the ink composition for an aqueous ink ball point pen as described in claim 8.

* * * * *